May 16, 1961 H. N. DRAUDT ET AL 2,984,170
INJECTION MACHINE
Filed Aug. 26, 1957 9 Sheets-Sheet 5

INVENTORS
HOWARD NED DRAUDT
REUBEN JOSEPH GUNDERSON
BY
Kenyon & Kenyon
ATTORNEYS

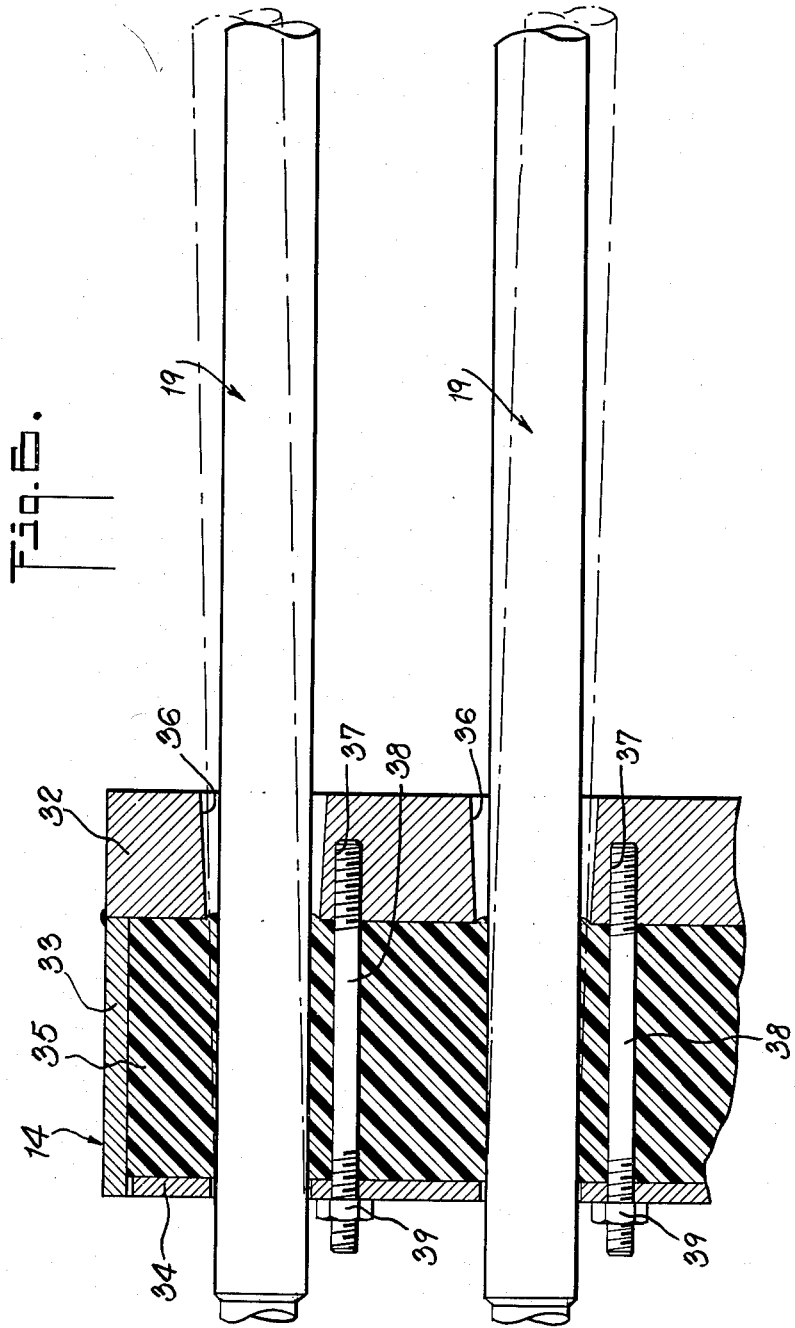

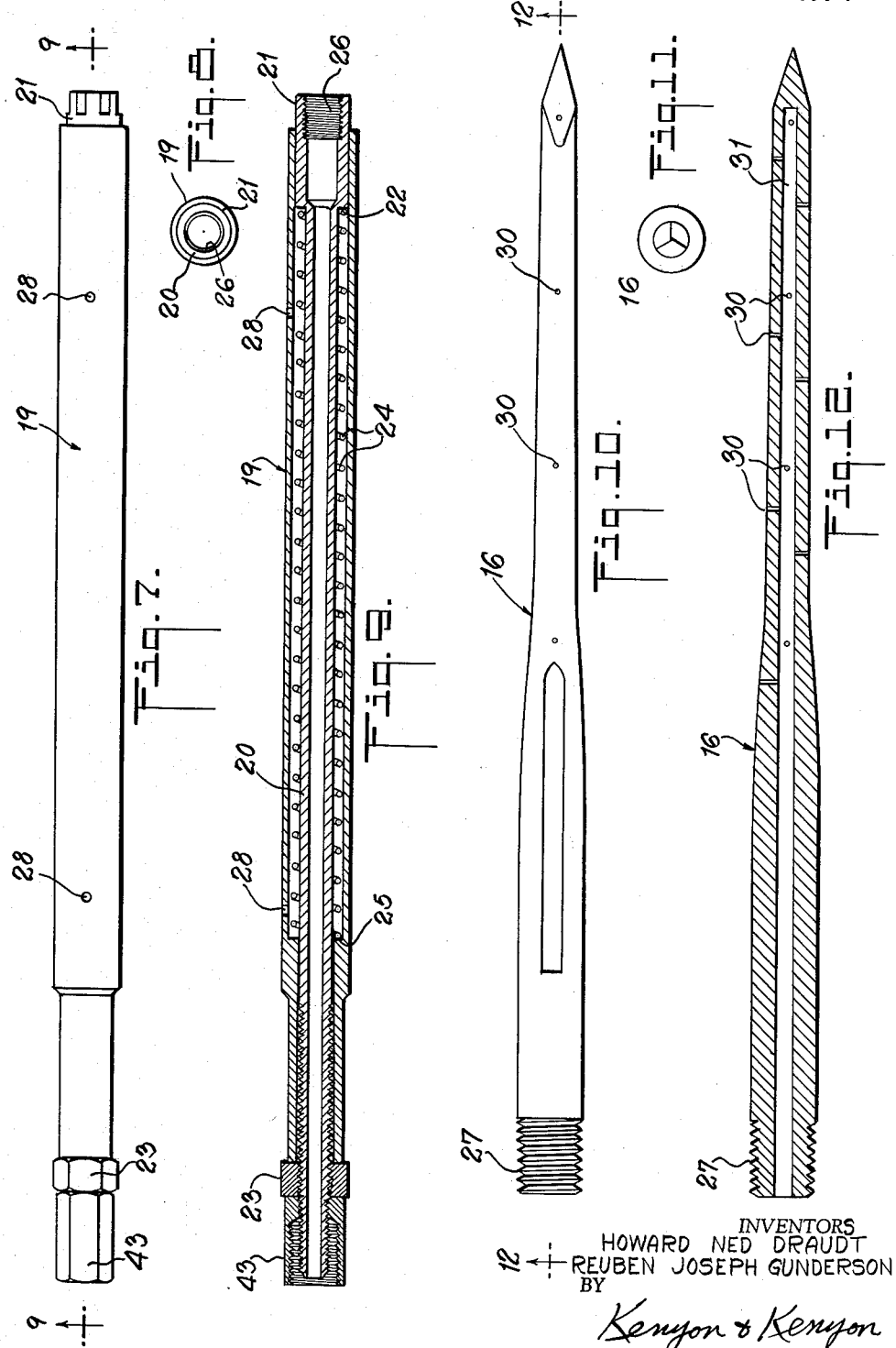

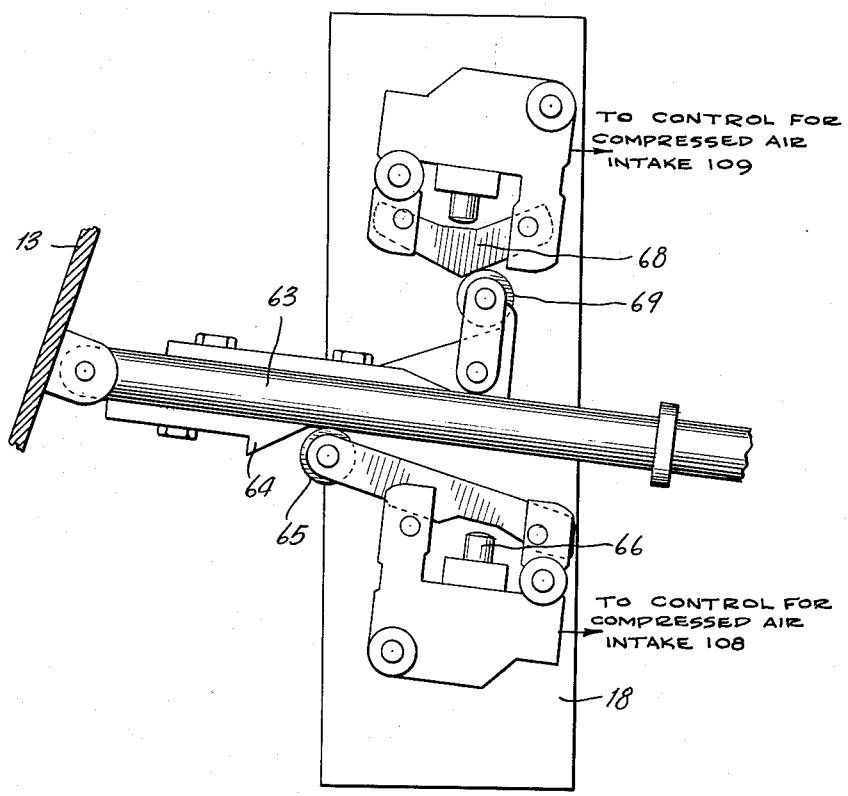

United States Patent Office 2,984,170
Patented May 16, 1961

2,984,170

INJECTION MACHINE

Howard Ned Draudt, Beech Grove, and Reuben Joseph Gunderson, Indianapolis, Ind., assignors to Hygrade Food Products Corporation, a corporation of New York Filed Aug. 26, 1957, Ser. No. 680,111

14 Claims. (Cl. 99—257)

This invention relates generally to injection machinery for processing and curing meat and more particularly to a multiple-needle injection machine adapted automatically to inject fluid into meat or other objects incorporating obstacles such as bones, the machine operating to insert the needles in a manner such as not to rupture the bones or break or deform the needles.

In the processing and curing of meat products, and in the meat industry in general, it is common practice to inject a liquid into the meat during processing and prior to packaging and distribution. This liquid which is injected into the meat is commonly referred to as curing pickle and usually is constituted by a solution containing sodium chloride and sodium nitrite and possibly sodium nitrate and a phosphate mixture. The purpose of the pickle is to cure the meat, enhance its flavor and improve its color. The pickle acts also as a preservative by retarding bacteria growth.

In various cuts of meat which are processed in this manner, such for example as hams and pork shoulders, there are one or more bones present in the meat. Due to the presence of these bones it has heretofore been considered impractical automatically to inject curing pickle into the meat with machines having a multiplicity of hollow needles mounted rigidly on a header since one or more of the needles may encounter these bones during their insertion. When these needles impinge on the bone damage to the bone and breakage and deformation of the needles may occur.

There are many economic advantages in the use of an injection machine which will automatically and simultaneously inject curing pickle at many points in meat products. If the curing pickle is injected into the meat at many points therein is substantially decreases the time required to cure the meat, in that the distance the soluble curing salts must move through the meat in order to reach all points is substantially decreased. This reduces the amount of storage space and decreases the inventory that must be maintained. For example, in curing bacon bellies by the so-called dry curing process wherein the bacon is covered with dry curing salts, the time required for curing is approximately two to three weeks, whereas if a water solution of curing salts is injected into the bacon by a large number of closely spaced needles the curing time is cut down to approximately two days.

Due to the drawbacks inherent in existing automatic injection machines with respect to the curing of meat products containing bone, it has been a common practice to make use of manual methods for this purpose. Two of these methods, namely, dry curing with solid curing salts and curing by immersion in solutions of curing salts, do not involve injection of curing pickle into the meat and depend on the process of diffusion from the surface of the meat to effect curing. Two other methods which involve manually injecting or pumping curing pickle in each piece of meat during the processing operation are artery pumping and stitch pumping.

In artery pumping, which is applicable only to hams, the curing pickle is manually injected into the artery in the ham. Artery pumping, however, requires considerable dexterity and skill, it is slow for it is necessarily a manual operation, and the distribution of the curing pickle is often uneven due to breakdown of the arterial system during pumping.

In stitch pumping, one or more hollow needles are connected to a common header, which is connected to a source of supply of curing pickle under pressure. These needles are inserted in the meat by a trial and error method to avoid any bones which may be present in the meat. With stitch pumping, unless an impractically long time is taken to inject curing pickle into the meat at many places, the curing pickle will not be uniformly distributed throughout the meat. In practice, due to this poor initial distribution of curing salts, the meat is held in a curing brime solution for three to five days to allow time for diffusion of the curing salts to all parts of the meat.

In both arterial and stich pumping, the quantity of curing pickle injected into the meat is determined and controlled either by volume or weight measurements. These manual methods of injecting curing pickle into meat, therefore, have the disadvantage of limiting production and entail a tedious and costly operation.

In view of the foregoing, it is the primary object of the present invention to provide an injection machine which will automatically inject a predetermined volume of curing pickle into cuts of meat without damaging any bones present therein and without breaking or in any way damaging the needles, regardless of the position of the bones in the meat.

Another object of the present invention is to provide an injection machine in which the needles are so constructed and arranged whereby the curing pickle is uniformly distributed throughout the meat that is being processed.

Still another object of the invention is to provide an automatic injection machine which is efficient and reliable in operation and which effects significant economies in the cost and time involved in meat processing. Briefly stated, the present invention accomplishes these objects by providing two coacting headers from which project a plurality of needles, the headers being mounted for reciprocal movement toward and away from each other. The meat to be processed is interposed between the retracted headers, which are then moved toward each other such that the needles penetrate the meat. The needles are so supported in the headers that if a certain area of a bone is encountered by one or more of the needles during their forward travel, further movement of these needles is blocked without however, arresting continued travel of the remaining needles along their designated paths. If one or more of the needles encounter other areas of the bone, such for example the area near their extremities, these needles are deflected from their normal direction of travel in order to bypass the bone without damaging or deforming the needle or bone, the needles however continuing to travel along their deflected path.

For a better understanding of the present invention as well as further objects and features thereof, reference is made to the following detailed description to be read in conjunction with the accompanying drawings wherein like components in the several views are identified by like reference numerals.

In the drawings:

Figure 6 is a cross-section taken along lines 6—6 of Figure 5.

Figure 7 is a front elevation of one of the cylinders of the present invention.

Figure 8 is a front end elevation of the cylinder illustrated in Figure 7.

Figure 9 is a cross-section taken along lines 9—9 of Figure 8.

Figure 10 is an elevational view of one of the needles of the present invention.

Figure 11 is a front end elevation of the needle illustrated in Figure 10.

Figure 12 is a cross-section taken along lines 12—12 of Figure 11.

Figure 13 is a side elevation of the unloading valve assembly for the injection machine of the present invention.

Figure 1:
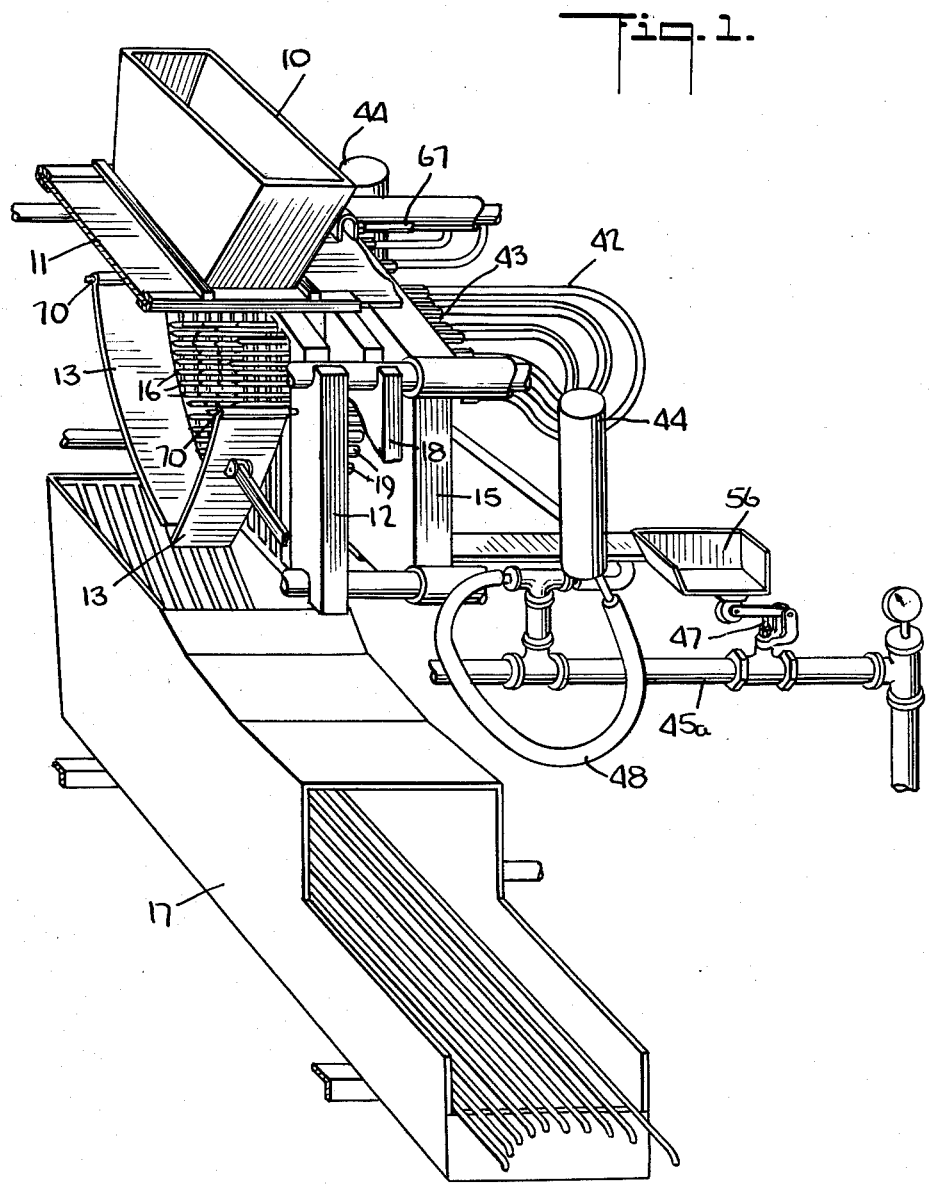
Figure 1 is a perspective view of a preferred embodiment of an injection machine in accordance with the present invention, one of the needle blocks being omitted for reasons of clarity. In this figure the supporting framework for the various elements has been eliminated for purposes of clarity.

Referring now to the drawings and more particularly to Figures 1 to 4, the meat product to be processed is fed either manually or automatically into the loading hopper 10. The meat product is retained in the hopper 10 by loading gate 11 which is opened and closed in a manner to be presently described. When loading gate 11 is opened the meat product falls into a work chamber defined by a pair of vertical stripper bars 12 disposed in spaced parallel relation and a bottom saddle 13 adapted to hold the meat in the chamber during the processing thereof and thereafter to discharge the meat into a chute. Rectangular headers 14 and 15 are provided behind the stripper bars and parallel thereto, the headers being reciprocable in opposing directions so that the headers are movable toward and away from the work chamber. Projecting from each of the headers are a plurality of needles 16 which pass through the openings in the stripper bars into the work chamber to engage the meat therein. When the headers have moved toward each other a predetermined distance, curing pickle is pumped through the needles 16 into the meat product. After a predetermined pumping time the headers are moved away from the work chamber and stripper bars 12 strip the meat product from the needles. When the headers have moved away from each other a predetermined distance the saddles 13 are opened to discharge the meat product into an unloading chute 17, the meat being carried to the next processing station.

The supporting framework of the injection machine of the present invention is generally denoted by the numeral 18. The headers 14 and 15 are slidably mounted on frame 18 in such manner as to be movable away from and toward each other and are activated in a manner to be presently described. A plurality of cylinders 19 are mounted in each header 14 and 15 and extend perpendicularly therefrom in the direction of the other header. The manner of mounting these cylinders 19 in each header will be presently described. Secured to the end of each cylinder 19 and extending axially therefrom are needles 16. The needles 16 and their associated cylinders 19 are mounted in each cylinder block as close together as is mechanically feasible in order to obtain as thorough an initial distribution of curing pickle in the meat product as possible.

The number of cylinders and needles mounted in each header is dependent upon the number and size of meat products that are to be processed on each cycle of the injection machine. As illustrated in Figure 1 the cylinders and needles may be mounted in such manner as to conform to the shape of the product being processed, such for example as pork shoulders. It is to be understood, however, that the cylinders 19 may be mounted on the headers 14 and 15 in any desired pattern subject only to the requirement that the needles be distributed in such manner as to penetrate the maximum area of the product.

If the product being processed contains bones a number of the needles 16 will encounter these bones during the travel of the headers toward each other. When this occurs if the needles are rigidly affixed to the header either the movement of the headers will be retarded or if there is sufficient force moving the headers either the bones will be damaged or the needles will break or bend to bypass the bones. In order to avoid this each needle 16 is spring biased such that when a needle encounters a bone during its forward travel the needle will be retracted while the other needles will continue their forward travel. The manner in which this is accomplished is illustrated in Figures 7 through 12.

As illustrated in Figures 7 and 9 each cylinder 19 is constituted by an elongated tubular shell with a hollow rod 20 extending axially therethrough and slidably movable therein. The rod 20 is of such length that it extends from both ends of the tubular shell and is formed with a flanged portion 21 at one end to form a shoulder 22. The other end of rod 20 is externally threaded with threads complementary to the internal threading on a nut 23. Annularly surrounding the rod 20 is a spring 24, one end of which bears against the shoulder 22. The other end of spring 24 bears against annular shoulder 25 formed on the inner circumference of the tubular shell. The end of the rod 20 adjacent the shoulder 22 is internally threaded with threads 26 complementary to the external threading 27 on the outer circumference of the needles 16. In this manner each needle 16 can be threadably coupled to a cylinder 19. The tubular shell of each cylinder 19 is provided with holes 28 for drainage of curing pickle.

In assembling the cylinder of the present invention the spring 24 is slipped over rod 20 until one end is engaged by shoulder 22. Rod 20 is then inserted in the tubular shell of cylinder 19 until spring 24 is engaged by shoulder 25. Spring 24 is then compressed by applying pressure to the internally threaded end of rod 20 until the externally threaded end of rod 20 protrudes beyond the other end of the tubular shell. Nut 23 is then screwed on this threaded end to maintain the spring 24 under tension. The degree of compression of spring 24 is controlled by nut 23, and by tightening or loosening the nut 23 the length of the rod 20 extending from the tubular shell of cylinder 19 can be varied. In this manner the internally threaded ends of rods 20 can be aligned in a vertical plane by adjusting nut 23.

The needles 16 are threadably coupled to cylinders 19 by means of threads 26 and 27 to form an axial extension thereof. In order to permit the needles to retract on contact with bone without breaking or deforming they must have great mechanical strength. This is accomplished with the needles of the present invention by forging them for example from type 304 stainless steel tubing. Applicants have found that needles fabricated by forging have Rockwell hardnesses ranging from 87 to 104 through the length of the needle, while a comparable needle needle 16 is maintained nearly constant regardless of whether the needle is inserted in a meat product during pumping by providing openings 30 on the needle 16 with small diameters and by using a main pickle pump with sufficient capacity to maintain the desired pressure.

In operating the injection machine of the present invention the product or products to be processed are placed, either manually or automatically in the loading hopper 10 where they rest on loading gate 11. For purposes of illustration it will be assumed that the headers 14 and 15 have moved axially apart to their fullest extent, and that one or more of the products to be processed are in the chamber formed by the stripper grid bars 12 and the saddle 13.

In this position of the headers, cam 49, which is mounted on rod 50, depresses lever 51 which closes normally open micro-switch 52 mounted in control box 53. Rod 50 is secured to header assembly 14 and is movable therewith. When micro-switch 52 is closed it energizes solenoid 105 which in turn activates solenoid 105a. When solenoid 105a is energized, it activates the right hand port of four-way bleeder valve 106 to supply compressed air to housings 54 to move plungers 55 axially towards each other. The ends of plungers 55 are connected to header assemblies 14 and 15 and move these assemblies toward each other. As the header assemblies move toward each other the needles are inserted in the product and those needles that contact bone are retracted while others that contact the extremities of bone are deflected to bypass the bone. When the assemblies 14 and 15 have virtually completed their forward travel cam 56, which is secured to header assembly 15 opens normally closed valve 47. This permits curing pickle to flow to the needles 16 and commences the pumping part of the cycle.

During the forward movement of header assembly 14 cam 49 is moved out of engagement with micro-switch 52 which returns to its normally open position deenergizing solenoids 105 and 105a which shuts off the flow of compressed air from four-way bleeder valve 106 to housings 54, while cam 57, which is also secured to rod 50, closes normally open switch 58 which activates an adjustable electrical time delay (not shown). At the end of this time delay solenoid 107 is energized which in turn energizes solenoid 107a. When solenoid 107a is energized it opens the left hand port of four-way bleeder valve 106 to supply compressed air to housings 54 to move header assemblies 14 and 15 axially away from each other. As these assemblies commence their return movement switch 58 is returned to its normally open position and valve 47 to its normally closed position which interrupts the flow of curing pickle to the needles 16. It can therefore be seen that the volume of curing pickle pumped into the product is a function of both the time delay circuit and pump pressure and can be controlled by adjusting these variables.

As the header assemblies 14 and 15 continue their return movement one way cam 61 which is secured to the header assembly 14 trips valve 59 which is secured to stationary arm 60 to supply compressed air from the four-way bleeder valve 108 to housings 62 to move pistons 63. This opens trap door saddles 13 which pivot on hinges 70, and allows the product being processed to fall into the unloading and pickle recovery chute 17. As piston rods 63 move to open saddles 13, cam 64 (Figures 4 and 13), which is secured to one of the piston rods 63, depresses roller 65 which trips a normally open valve 66. When valve 66 is closed compressed air is supplied from the four-way bleeder valve 108 to the other side of housings 62 which reverses the direction of motion of pistons 63 and closes the saddles 13. During the return motion of pistons 63, one way roller 69, which is mounted on one of the pistons 63, trips a valve 68. When valve 68 is tripped compressed air is supplied from the four-way bleeder valve 109 to housing 71 to move plunger arm 67 which opens loading gate 11. This allows product to fall from the loading hopper 10 into the chamber formed by the stripper grid bars 12 and the saddles 13. When bleeder arm 67 has moved sufficiently to open loading gate 11, cam 74, which is secured to plunger arm 67 depresses roller 72 which trips a normally open valve 73. When normally open valve 73 is closed, compressed air is supplied from the four-way bleeder valve 109 to the other side of housing 71 which reverses the movement of plunger arm 67 and closes the loading gate 11.

This completes one cycle of the injection machine of the present invention and micro-switch 52 is again engaged by cam 51 to repeat the cycle.

The rate of production of the injection machine of the present invention is governed by several factors. These include the time required for the product to fall by gravitational force, the time required for the cylinder blocks to move through one cycle and the time required to pump curing pickle into the product. In practice it has been found that the injection machine of the present invention can be satisfactorily operated at rates up to 13 cycles per minute.

When the machine of the present invention is used to process food products such as meat the metallic portions of the machine which are in contact with the product or curing pickle are preferably fabricated from stainless steel, and the tubing from a non-toxic material. In this manner the necessity for frequent replacement of parts due to corrosion is eliminated as well as one source of contamination of the food product.

What has been described is an injection machine that will automatically inject curing pickle simultaneously throughout a product containing bone, without injury to the bone or breakage or bending of the needles used to inject the curing pickle. It is to be understood that although the invention has been described with reference to a specific embodiment other embodiments are contemplated as within the scope of this invention as defined by the appended claims. For example, while the invention has been described with reference to an injection machine having two headers movable away from or toward a chamber containing the meat to be processed, it is to be understood that the invention may be practiced as well with an injection machine having only one header. With this embodiment the meat to be processed is placed in a receptacle, either manually or automatically, and the header is moved toward the receptacle to inject curing pickle into one side of the meat. The position of the meat in the receptacle is then reversed such that the other side is in position to be injected with curing pickle.

It can therefore be seen that the invention can be practiced with one or more headers the only requirement being that each header mount the needles in the manner heretofore described.

We claim:
1. An injection machine for injecting curing pickle into meat products comprising a work chamber for supporting meat to be processed, a pair of headers reciprocably mounted for movement in opposing directions relative to said chamber, a plurality of hollow needles projectable from each of said headers whereby when said headers move toward said chamber said needles penetrate the meat therein, means to feed curing liquid to each of said hollow needles for injection into the meat penetrated thereby, each of said needles being spring biased in the direction of said chamber, and means mounting each of said needles perpendicularly on the associated header, said mounting means permitting limited deflection of said needle from said perpendicular position.

2. An injection machine for injecting curing pickle into meat products containing bone comprising a work chamber for supporting meat to be processed, a pair of headers reciprocably mounted for movement in opposing directions relative to said chamber, a plurality of hollow needles projectable from each of said headers formed by machining has Rockwell hardnesses ranging from 78 to 91.

As illustrated in Figures 10 and 12 the needles 16 of the present invention are tapered in order to facilitate entry into the meat product. The outer circumference of each needle is provided with a plurality of radial openings 30 to distribute the curing pickle throughout the meat product. These openings 30 are spaced at equal intervals axially along the needle 16 and are arranged in a spiral pattern to obtain a uniform distribution of curing pickle and to minimize pressure drops. It is to be noted that the inner diameter of the needles 16 are gradually decreased in the forward direction such that the resistance to liquid flow in the needle 16 is negligible as compared to the resistance to flow through the openings 30. In this respect the cross-sectional area of the passageway 31 in the needles 16 at every point along the length of the needles should be greater than the combined cross-sectional areas of the openings 30 in the forward direction of the needle. The purpose of this is to obtain a minimum pressure drop in the system while still maintaining a maximum amount of metal in the needle for structural strength. In addition, with this design the majority of the pressure drop through the needles occurs at the openings 30.

As stated previously, the nut 23 serves a two-fold purpose—to vary the tension of spring 24 and to vary the length of the cylinder—needle assembly such that the tips of the needles 16 are maintained in a vertical plane. The spring 24, however, must be compressed within the piston to such an extent that the minimum force exerted by the spring is sufficient to allow the tip of the needle 16 to penetrate the meat product without retracting. It has been found that this minimum force is approximately 15 pounds with a needle tip that is in the form of a pyramid with a triangular base, and approximately 30 pounds with a needle with a conical tip.

It can therefore be seen that if one or more of the needles encounter a bone during their insertion in the meat products these needles will be retracted while the other needles will continue in their designated paths of travel. If the point of one or more of the needles encounter the outer portion of a bone, however, the component of force acting in the axial direction of the needle will not be great enough the overcome the tension of the spring 24 to retract the needle 16, and the needle will therefore have a tendency to bend or deform to bypass the bone. In order to prevent this the cylinders 19 are mounted in the headers 14 and 15 in such manner that they are permitted an angular deviation from their axial direction to facilitate a change in their direction of movement to bypass a bone. The manner in which this is accomplished is illustrated in Figures 5 and 6.

Figure 5:
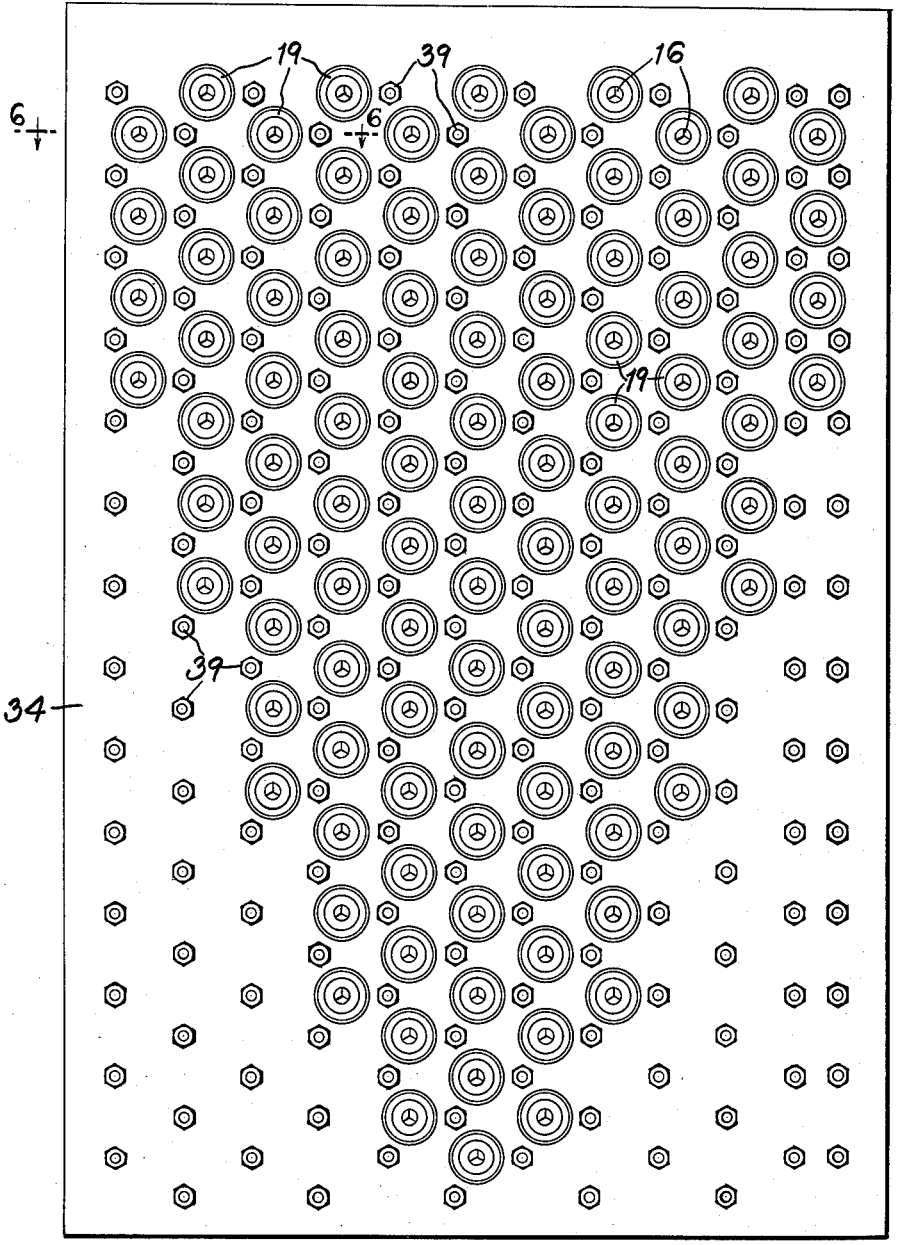
Figure 5 is a front elevation of the cylinder block of the present invention.
Figure 14:
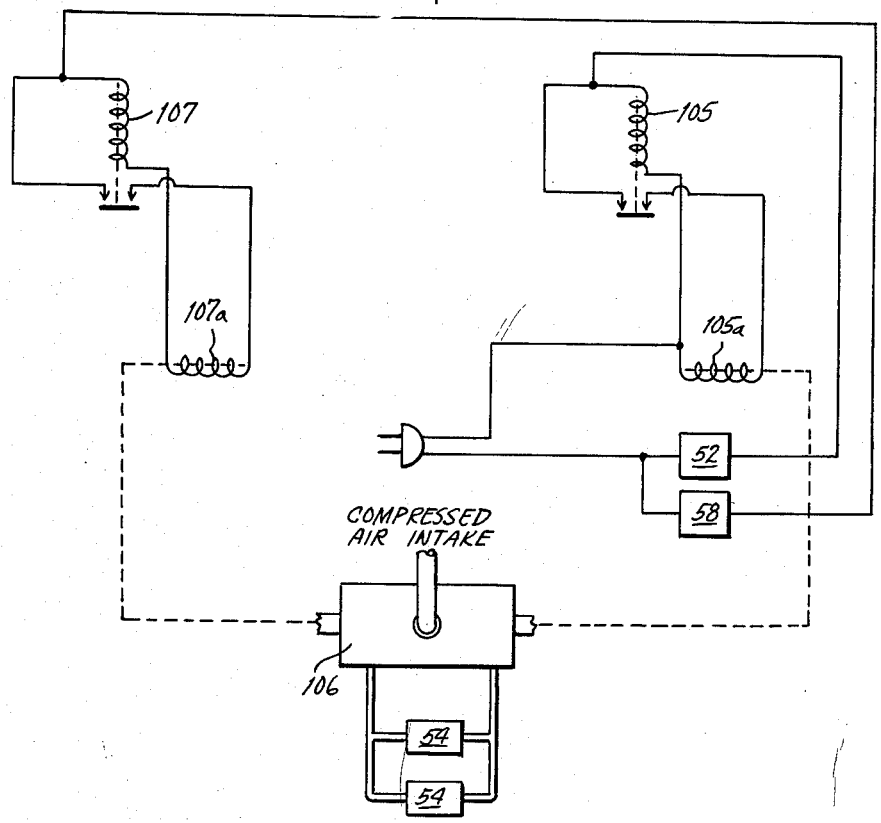
Figure 14 is a schematic drawing illustrating the electrical and compressed air connections for reciprocal movement of the headers.
Figure 15:
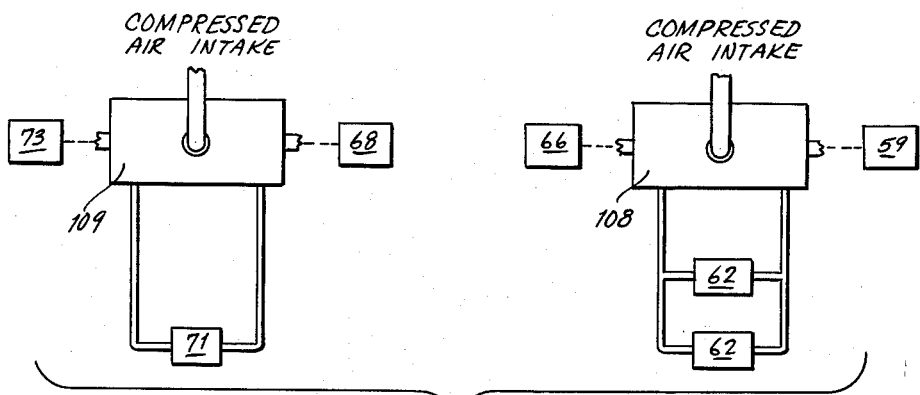
Figure 15 is a schematic diagram illustrating the compressed air connections for operating the unloading gate and saddles.

As illustrated in Figures 5 and 6 the headers 14 and 15 are constituted by plates 32, 33 and 34 which form a casing. Mounted within the casing formed by these plates is a block of elastomer material 35 having elastic properties similar to rubber, such as neoprene, chloroprene, silicone rubber, etc., but which is preferably resistant to animal fat. Plate 32 is drilled with a plurality of holes 36 with a diameter greater than that of the cylinders 19. These holes are then reamed with a Morse taper reamer to provide for angular displacement of the cylinders 19. The plate 32 is also drilled and taped such as at 37 at spaced intervals throughout the area of plate 32. These taped holes 37 are adapted to threadably couple bolts 38 to plate 32. Plate 33 is secured to plate 32, such for example as by welding, to form a box-like enclosure to receive the block of elastomer material 35. This block 35 is drilled with holes for the bolts 38 and cylinders 19 that are in axial alignment with the holes 36 and 37 in plate 32. When the block of elastomer material 35 is in position the unit is sealed by placing plate 34 over the block 35 and within the enclosure formed by plate 33. Plate 34 is also drilled with holes in axial alignment with the holes 36 and 37 in plate 32.

The manner in which the cylinders 19 are held by the headers 14 and 15 is illustrated in Figure 6. The cylinders 19 are inserted through the openings in plates 34, block 35 and plate 32 as well as the bolts 38 which are threaded in taped holes 37. The other end of bolt 38 is also externally threaded with threads complementary to the interval threading on nut 39. It is evident that as nut 39 is tightened, the block 35 will be compressed and frictionally engage the cylinder 19. The degree of rigidity with which the block 35 holds the cylinder 19 is dependent on the degree to which the block 35 is compressed and the durometer of the block. In the preferred form of the invention a block of neoprene approximately two inches thick with a 60 durometer is used. In practice it has been found that if the angular movement of the cylinders 19 from normal is limited to a maximum of 3 degrees, the needles will not be bent or deformed.

Figure 2:
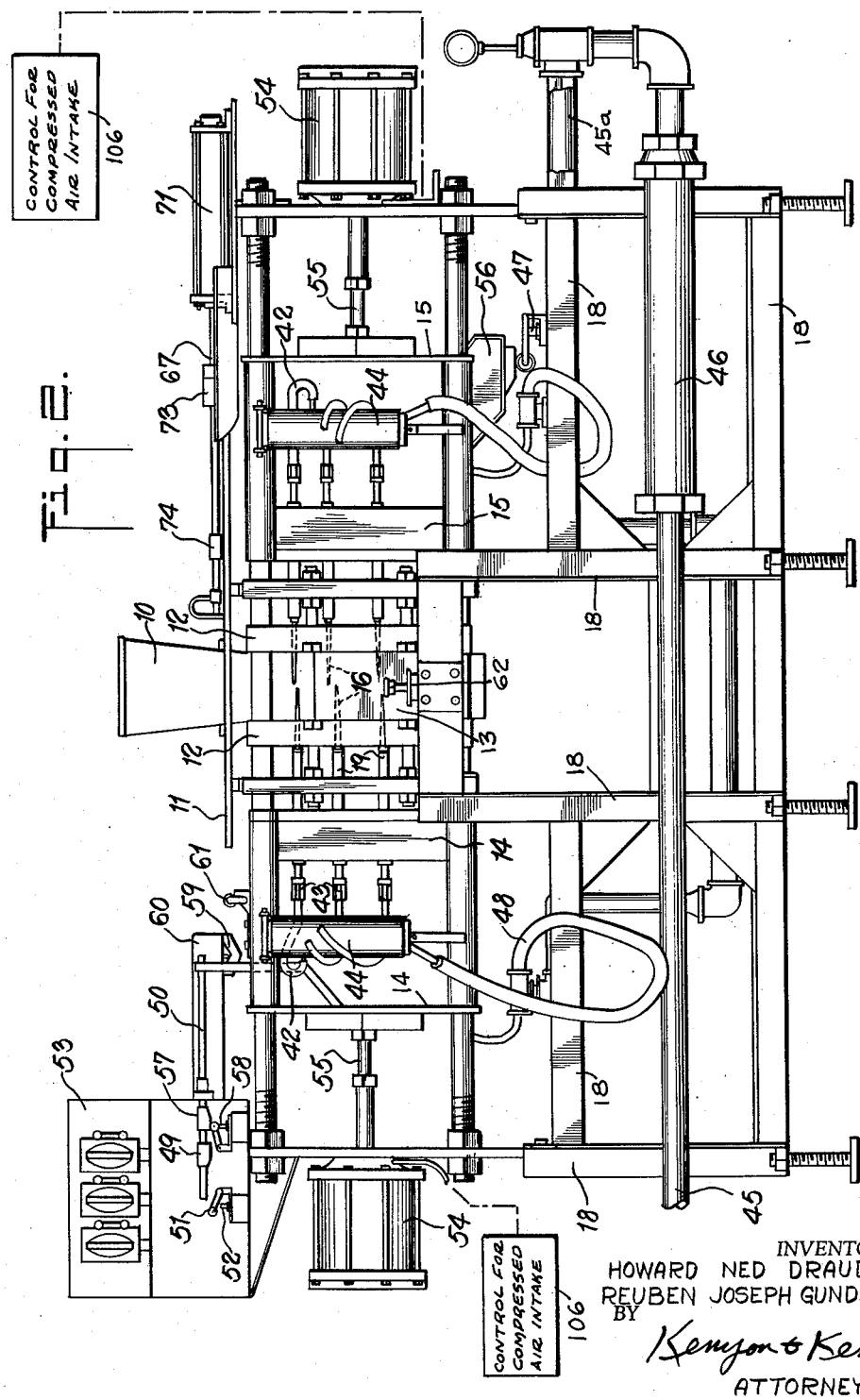
Figure 2 is a front elevation of the injection machine of the present invention, certain incidental elements which are shown in other views being omitted in the interest of clarity.
Figure 3:
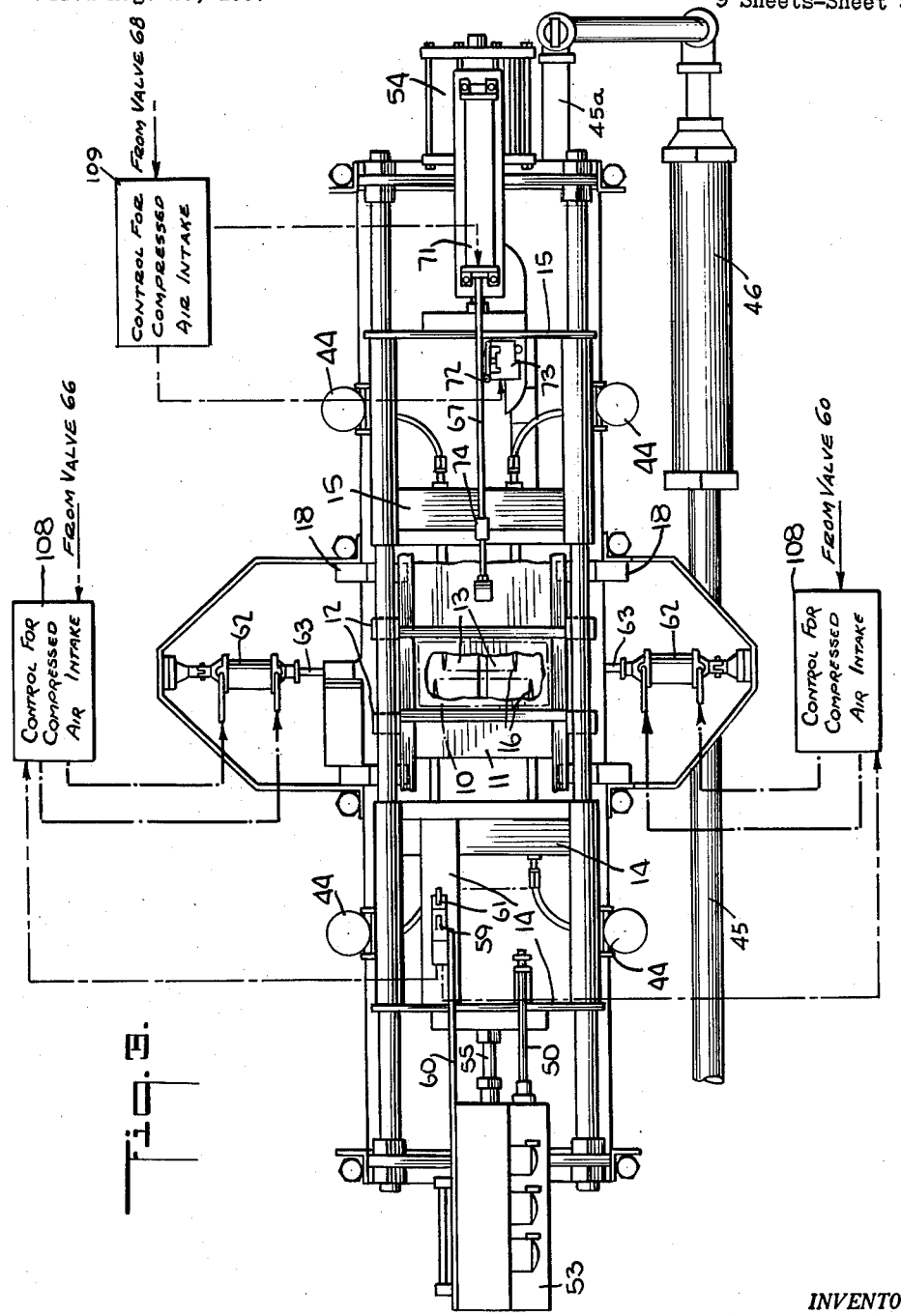
Figure 3 is a plan view of the injection machine of the present invention.
Figure 4:
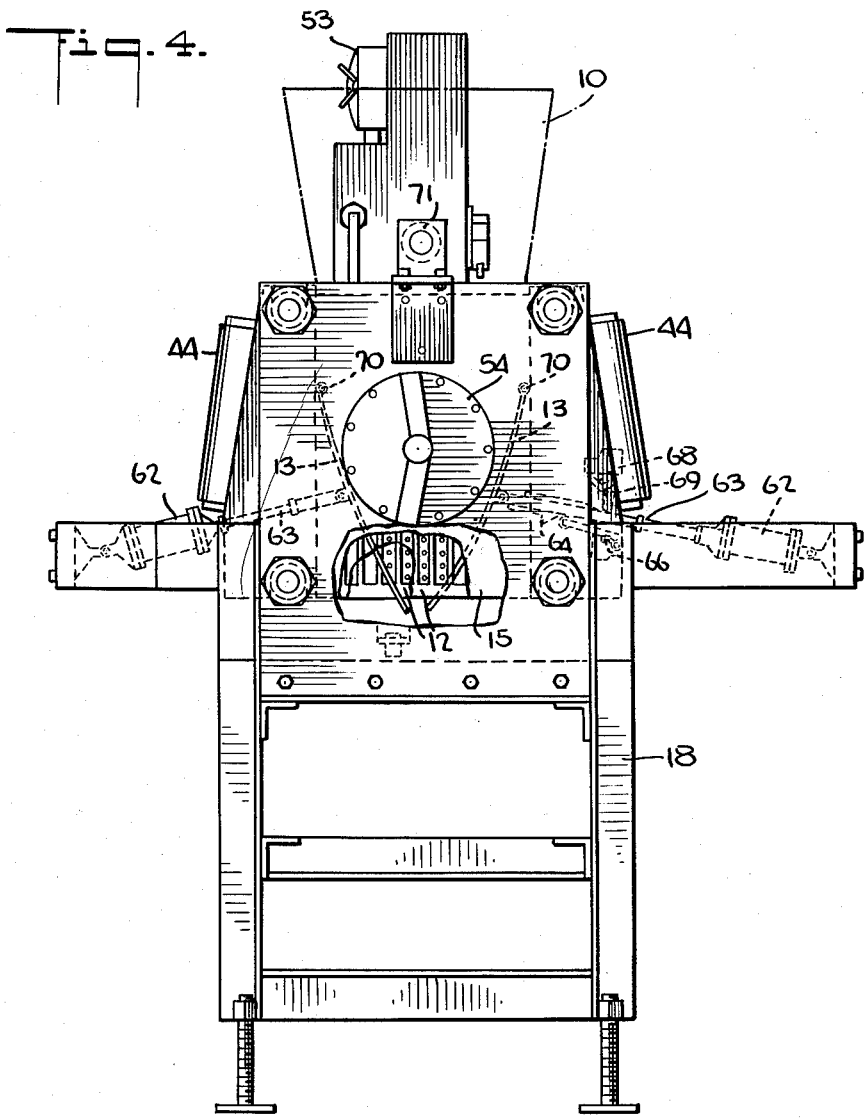
Figure 4 is an end elevation of the injection machine of the present invention taken from the right side in Figure 2.

When the headers 14 and 15 are assembled as described with the cylinders 19 in position the headers are mounted on the framework 18 in such manner that they are movable away from or toward each other. The stroke of each header is dependent upon the spacing between the stripper grid bars 12 and the size of the product being processed. In the preferred form of the invention the cylinders 19 and their associated needles 16 are mounted in each header in such manner that the bank of needles in one header are not in axial alignment with the bank of needles in the other header. The purpose of this offset is to permit a slight overlapping of the needle tips in each bank during the forward stroke of the headers as illustrated in Figure 2 to obtain a more uniform distribution of curing pickle through the product. The return stroke of the headers must be long enough to carry the tips of the needles 16 behind the stripping grid bars 12 such that the product being processed is stripped completely from the needles.

The curing pickle is supplied to each needle 16 by hoses 42 coupled to each cylinder 19 by fittings 43. Each of the hoses 42 is connected to one of the four tanks 44 secured to the frame 18. It is therefore seen that curing pickle is conducted separately to each needle 16 from one of the tanks 44 through hoses 42. A continuous supply of curing pickle is maintained in a surge tank (not shown) to which fresh curing pickle is added to maintain a constant level. In addition, curing pickle flowing through the needles 16 which is not pumped into the product being processed because the needles were not inserted in the product at the time of pumping is collected at the unloading and curing pickle recovery chute 17 and returned to the surge tank to be recirculated. This mixture of used and fresh curing pickle is pumped from the surge tank through a filter (not shown) to a second tank (not shown). In order to aid filtration and to coat the filter, a food grade diatomaceous earth filter, such for example as Celite, is preferably added to the pickle in the first surge tank. This filter aid is removed by the filter between the first and second surge tanks.

Curing pickle is supplied to each of the tanks 44 by the main pickle pump (not shown) from the second surge tank. The pressure is controlled by a valve (not shown) that regulates the amount of recycle of curing pickle at the main pickle pump. From the main pickle pump the curing pickle passes through pipe 45, to the cloth bag filter 46 through pipe 45a where along is located cam operated automatic pickle valve 47 which is open only on the closed or pumping portion of the injection machine cycle. The operation of this valve 47 will be presently described. From valved pipe 45a the curing pickle is conducted by hoses 48 to each of the four tanks 44. The hoses 48 supplying the tanks 44 on header 14 are connected to union 100 while the tanks 44 on header 15 are connected to union 101. The pressure in each whereby when said headers move toward said chamber said needles penetrate the meat therein, means to feed curing liquid to each of said hollow needles for injection into the meat penetrated thereby, each of said needles being spring biased in the direction of said chamber whereby further motion of needles that contact bone during penetration of the meat is arrested while needles that do not contact bone continue their forward movements, and means mounting each of said needles perpendicularly on the associated header, said mounting means permitting limited deflection of said needle from said perpendicular position whereby needles that contact peripheral portions of bone during penetration of the meat are deflected from their normal direction of travel to bypass the bone while continuing their forward movement along said deflected path.

3. An injection machine for injecting curing pickle into meat products containing bone comprising a work chamber for supporting meat to be processed, a pair of headers reciprocably mounted for movement in opposing directions relative to said chamber, a plurality of hollow needles projectable from each of said headers whereby when said headers move toward said chamber said needles penetrate the meat therein, means to feed curing liquid to each of said hollow needles for injection into the meat penetrated thereby, each of said needles being spring biased in the direction of said chamber whereby further motion of needles that contact bone during penetration of the meat is arrested while needles that do not contact bone continue their forward movement, each of said needles being constituted by a pointed needle element, a piston and a cylinder, said piston being concentrically disposed within said cylinder, a compressable spring surrounding said piston within said cylinder and arranged to urge said piston outwardly from said cylinder, said needle element being coupled to one end of said piston and projecting axially from said cylinder, adjustable stop means on the other end of said piston to vary the compression of said spring, said needle element having a longitudinal passage therein and provided with a plurality of lateral openings communicating with said passage, said openings being positioned at spaced points along an imaginary helical line encircling said needle and means mounting each of said needles perpendicularly on the associated header, said mounting means permitting limited deflection of said needle from said perpendicular position whereby needles that contact peripheral portions of bone during penetration of the meat are deflected from their normal direction of travel to bypass the bone while continuing their forward movement along said deflected path.

4. An injection machine for injecting curing pickle into meat products containing bone comprising a pair of stripper grids mounted in spaced parallel relationship, a trap door saddle extending between the lower extremities of said stripper grids, said stripper grids forming the sidewalls and said saddle forming the bottom wall of a work chamber for supporting meat to be processed, a header mounted behind each stripper grid in parallel relationship thereto, said headers being reciprocably supported for movement in opposing directions relative to said chamber, a plurality of hollow needles projectable from each of said headers whereby when said headers move toward said chamber said needles pass through said grids to penetrate the meat in said chamber, means to feed curing liquid to each of said hollow needles for injection into the meat penetrated thereby, each of said needles being spring biased in the direction of said chamber whereby further motion of needles that contact bone during penetration of the meat is arrested while needles that do not contact bone continue their forward movements, each of said needles being constituted by a pointed needle element, a piston and a cylinder, said piston being concentrically disposed within said cylinder, a compressable spring surrounding said piston within said cylinder and arranged to urge said piston outwardly from said cylinder, said needle element being coupled to one end of said piston and projecting axially from said cylinder, adjustable stop means on the other end of said piston to vary the compression of said spring, said needle element having a longitudinal passage therein and provided with a plurality of lateral openings communicating with said passage, said openings being positioned at spaced points along an imaginary helical line encircling said needle and means mounting each of said needles perpendicularly on the associated header, said mounting means permitting limited deflection of said needle from said perpendicular position whereby needles that contact peripheral portions of bone during penetration of the meat are deflected from their normal direction of travel to bypass the bone while continuing their forward movement along said deflected path.

5. An injection machine as set forth in claim 2 wherein each of said headers comprises a pair of plates mounted in spaced parallel relationship, a band secured to the edges of one of said plates and extending perpendicularly therefrom to enclose the area between said plates, a block of resilient material mounted within the area between said plates, and means interconnecting said plates to draw said plates toward each other whereby said resilient block is compressed.

6. An injection machine for injecting curing pickle into meat products containing bone comprising a pair of stripper grids mounted in spaced parallel relationship, a trap door saddle extending between the lower extremities of said stripper grids, said stripper grids forming the sidewalls and said saddle forming the bottom wall of a work chamber for supporting meat to be processed, means to open and close said trap door saddle to discharge processed meat from said chamber, a header mounted behind each stripper grid in parallel relationship thereto, said headers being reciprocably supported for movement in opposing directions relative to said chamber, means to reciprocate said headers, a plurality of hollow needles projectable perpendicularly from each of said headers whereby when said headers move toward said chamber said needles pass through said grids to penetrate the meat in said chamber, means to feed curing liquid to each of said hollow needles for injection into the meat penetrated thereby, each of said needles being spring biased in the direction of said chamber whereby further motion of needles that contact bone during penetration of the meat is arrested while needles that do not contact bone continue their forward movement, each of said needles being constituted by a pointed needle element, a piston and a cylinder, said piston being concentrically disposed within said cylinder, a compressible spring surrounding said piston within said cylinder and arranged to urge said piston outwardly from said cylinder, said needle element being coupled to one end of said piston and projecting axially from said cylinder, adjustable stop means on the other end of said piston to vary the compression of said spring, said needle element having a longitudinal passage therein and provided with a plurality of lateral openings communicating with said passage, said openings being positioned at spaced points along an imaginary helical line encircling said needle, each of said headers being constituted by a pair of plates mounted in spaced parallel relationship, a band secured to the edges of one of said plates and extending perpendicularly therefrom to enclose the area between said plates, a block of resilient material mounted within the area between said plates, openings in said plates and block to permit insertion of said cylinders therethrough, means interconnecting said plates to draw said plates toward each other whereby said resilient block is compressed to frictionally engage the circumference of said cylinders, and said openings in said plates adjacent said stripper grids being tapered to permit limited deflection of said needles from said perpendicular position whereby needles that contact peripheral portions of bone during penetration of the meat are deflected from their normal direction of travel to bypass the bone while continuing their forward movement along said deflected path.

7. An injection machine for injecting curing pickle into meat products containing bone comprising a pair of stripper grids mounted in spaced parallel relationship, a trap door saddle extending between the lower extremities of said stripper grids, a gate extending between the upper extremities of said stripper grids, a hopper mounted above said gate and adapted to hold meat to be processed, said gate forming the bottom wall of said hopper, said stripper grids, saddle and gate forming a chamber for supporting meat during processing, means to open and close said gate to discharge meat from said hopper into said chamber, means to open and close said trap door to discharge processed meat from said chamber, a header mounted behind each stripper grid in parallel relationship thereto, said headers being reciprocably supported for movement in opposing directions relative to said chamber, means to reciprocate said headers, a plurality of hollow needles projectable perpendicularly from each of said headers whereby when said headers move toward said chamber said needles pass through said grids to penetrate the meat in said chamber, means to supply curing pickle to said needles when said needles penetrate said meat, each of said needles being spring biased in the direction of said chamber whereby further motion of needles that contact bone during penetration of the meat is arrested while needles that do not contact bone continue their forward movement, each of said needles being constituted by a pointed needle element, a piston and a cylinder, said piston being concentrically disposed within said cylinder, a compressible spring surrounding said piston within said cylinder and arranged to urge said piston outwardly from said cylinder, said needle element being coupled to one end of said piston and projecting axially from said cylinder, adjustable stop means on the other end of said piston to vary the compression of said spring, said needle element having a longitudinal passage therein and provided with a plurality of lateral openings communicating with said passage, said openings being positioned at spaced points along an imaginary helical line encircling said needle, each of said headers being constituted by a pair of plates mounted in spaced parallel relationship, a band secured to the edges of one of said plates and extending perpendicularly therefrom to enclose the area between said plates, a block of resilient material mounted within the area between said plates, openings in said plates and block to permit insertion of said cylinders therethrough, means interconnecting said plates to draw said plates toward each other whereby said resilient block is compressed to frictionally engage the circumference of said cylinders, and said openings in said plates adjacent said stripper grids being tapered to permit limited deflection of said needles from said perpendicular position whereby needles that contact peripheral portions of bone during penetration of the meat are deflected from their normal direction of travel to bypass the bone while continuing their forward movement along said deflected path.

8. An injection machine for injecting curing pickle into meat products comprising a work chamber for supporting meat to be processed, a header reciprocably mounted for movement away from or toward said chamber, a plurality of hollow needles projectable from said header whereby when said header moves toward said chamber said needles penetrate the meat therein, means to feed curing liquid to each of said hollow needles for injection into the meat penetrated thereby, each of said needles being spring biased in the direction of said chamber, and means mounting each of said needles perpendicularly on the header, said mounting means permitting limited deflection of said needle from said perpendicular position.

9. An injection machine for injecting curing pickle into meat products containing bone comprising a work chamber for supporting meat to be processed, a header reciprocably mounted for movement away from or toward said chamber, a plurality of hollow needles projectable from said header whereby when said header moves toward said chamber said needles penetrate the meat therein, means to feed curing liquid to each of said hollow needles for injection into the meat penetrated thereby, each of said needles being spring biased in the direction of said chamber whereby further motion of the needles that contact bone during penetration of the meat is arrested while needles that do not contact bone continue their forward movements, and means mounting each of said needles perpendicularly on the header, said mounting means permitting limited deflection of said needle from said perpendicular position whereby needles that contact peripheral portions of bone during penetration of the meat are deflected from their normal direction of travel to bypass the bone while continuing their forward movement along said deflected path.

10. An injection machine for injecting curing pickle into meat products containing bone comprising a pair of stripper grids mounted in spaced parallel relationship, a trap door saddle extending between the lower extremities of said stripper grids, a gate extending between the upper extremities of said stripper grids, a hopper mounted above said gate and adapted to hold meat to be processed, said gate forming the bottom wall of said hopper, said stripper grids, saddle and gate forming a chamber for supporting meat during processing, means to open and close said gate to discharge meat from said hopper into said chamber, means to open and close said trap door to discharge processed meat from said chamber, a header mounted behind each stripper grid in parallel relationship thereto, said headers being reciprocably supported for movement in opposing directions relative to said chamber, means to reciprocate said headers, a plurality of hollow needles projectable perpendicularly from each of said headers whereby when said headers move toward said chamber said needles pass through said grids to penetrate the meat in said chamber, means to supply curing pickle to said needles when said needles penetrate said meat, each of said needles being spring biased in the direction of said chamber whereby further motion of needles that contact bone during penetration of the meat is arrested while needles that do not contact bone continue their forward movement, each of said needles being constituted by a pointed needle element, a piston and a cylinder, said piston being concentrically disposed within said cylinder, a compressible spring surrounding said piston within said cylinder and arranged to urge said piston outwardly from said cylinder, said needle element being coupled to one end of said piston and projecting axially from said cylinder, adjustable stop means on the other end of said piston to vary the compression of said spring, said needle element having a longitudinal passage therein and provided with a plurality of lateral openings communicating with said passage, one end of said needle element being provided with a triangular tip, said openings being positioned at spaced points along an imaginary helical line encircling said needle, each of said headers being constituted by a pair of plates mounted in spaced parallel relationship, a band secured to the edges of one of said plates and extending perpendicularly therefrom to enclose the area between said plates, a block of resilient material mounted within the area between said plates, openings in said plates and block to permit insertion of said cylinders therethrough, means interconnecting said plates to draw said plates toward each other whereby said resilient block is compressed to frictionally engage the circumference of said cylinders, and said openings in said plates adjacent said stripper grids being tapered to permit limited deflection of said needles from said perpendicular position whereby needles that contact peripheral portions of bone during penetration of the meat are deflected from their normal direction of travel to bypass the bone while continuing their forward movement along said deflected path.

11. An injection machine as set forth in claim 1 wherein each of said needles comprises a cylinder, a piston concentrically disposed within said cylinder, a compressible spring surrounding said piston within said cylinder and arranged to urge said piston outwardly from said cylinder, and a needle element coupled to one end of said piston and projecting axially from said cylinder.

12. An injection machine as set forth in claim 1 wherein each of said needles comprises a cylinder, a piston concentrically disposed within said cylinder, a compressible spring surrounding said piston within said cylinder and arranged to urge said piston outwardly from said cylinder, and a needle element coupled to one end of said piston and projecting axially from said cylinder and adjustable stop means on the other end of said piston to vary the compression of said spring.

13. An injection machine as set forth in claim 1 wherein each of said needles comprises a cylinder, a piston concentrically disposed within said cylinder, a compressible spring surrounding said piston within said cylinder and arranged to urge said piston outwardly from said cylinder and a needle element coupled to one end of said piston and projecting axially from said cylinder, said needle element having a longitudinal passage therein and provided with a plurality of lateral openings communicating with said passage, and said openings being positioned at spaced points along said needle.

14. An injection machine as set forth in claim 1 wherein each of said needles comprises a cylinder, a piston concentrically disposed within said cylinder, a compressible spring surrounding said piston within said cylinder and arranged to urge said piston outwardly from said cylinder, and a needle element coupled to one end of said piston and projecting axially from said cylinder, adjustable stop means on the other end of said piston to vary the compression of said spring, said needle element having a longitudinal passage therein and provided with a plurality of lateral openings communicating with said passage, and said openings being positioned at spaced points along an imaginary helical line encircling said needle.

References Cited in the file of this patent

UNITED STATES PATENTS

| | | |
|---|---|---|
| 1,116,668 | Barringer | Nov. 10, 1914 |
| 1,271,490 | Servatius | July 2, 1918 |
| 1,987,349 | Rasmussen | Jan. 8, 1935 |
| 2,656,785 | Gannon et al. | Oct. 27, 1953 |
| 2,796,017 | Schmidt | June 18, 1957 |